United States Patent [19]
Plemmons et al.

[11] Patent Number: 5,127,795
[45] Date of Patent: Jul. 7, 1992

[54] STATOR HAVING SELECTIVELY APPLIED THERMAL CONDUCTIVITY COATING

[75] Inventors: Larry W. Plemmons, Fairfield; William C. Oakes, West Chester; Ralph A. Kirkpatrick, Cincinnati, all of Ohio

[73] Assignee: General Electric Company, Cincinnati, Ohio

[21] Appl. No.: 722,383

[22] Filed: Jun. 26, 1991

Related U.S. Application Data

[63] Continuation of Ser. No. 531,287, May 31, 1990, abandoned.

[51] Int. Cl.⁵ .............................................. F01D 5/08
[52] U.S. Cl. ..................................... 415/177; 415/115
[58] Field of Search .............. 415/115, 116, 117, 177, 415/178, 9; 60/39.75

[56] References Cited

U.S. PATENT DOCUMENTS

| | | | |
|---|---|---|---|
| 4,318,666 | 3/1982 | Pask | 415/116 |
| 4,642,027 | 2/1987 | Popp | 415/177 |
| 4,659,282 | 4/1987 | Popp | 415/177 |
| 4,787,817 | 11/1988 | Labrange et al. | 415/177 |
| 4,875,828 | 10/1989 | Willkop et al. | 415/177 |
| 4,875,837 | 10/1989 | Usami et al. | 415/177 |

FOREIGN PATENT DOCUMENTS 2540937  8/1984  France ........................ 415/115

Primary Examiner—Edward K. Look
Assistant Examiner—Christopher M. Verdier
Attorney, Agent, or Firm—Jerome C. Squillaro; John R. Rafter

[57] ABSTRACT

A gas turbine engine stator and method are disclosed which are effective for controlling non-axisymmetric radial running clearance between a stator flowpath surface and rotor blade tips. A coating of preselected thermal conductivity is predeterminedly disposed along the circumference of the stator to control circumferential thermally induced distortion and thereby control non-axisymmetric radial running clearance. In preferred embodiments of the invention, a high thermal conductivity coating may be applied to an annular flange for reducing temperature gradients therein. In another embodiment of the present invention, low thermal conductivity coatings may be applied to a stator to preferentially insulate the stator for reducing circumferential thermal distortion.

15 Claims, 3 Drawing Sheets

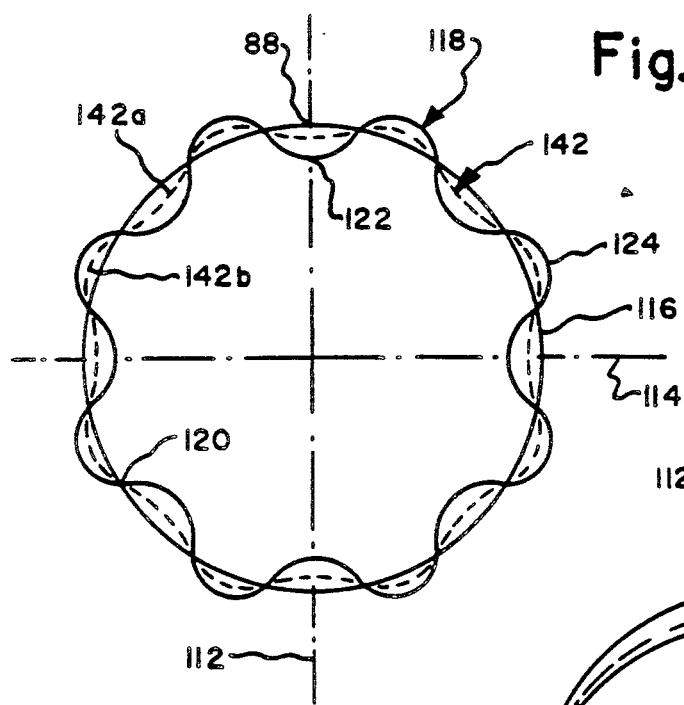
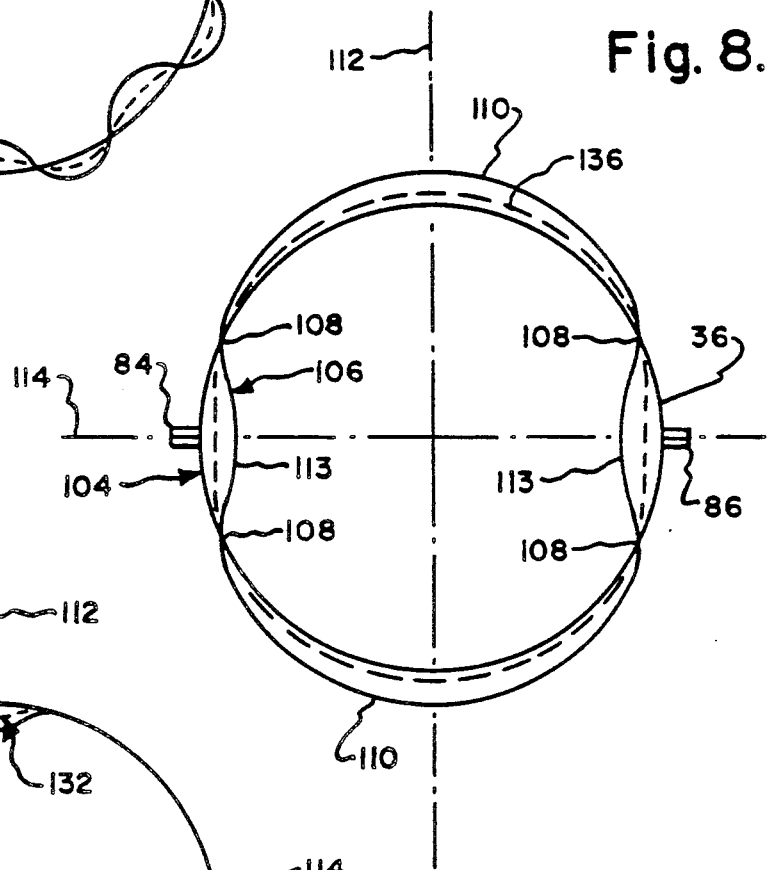
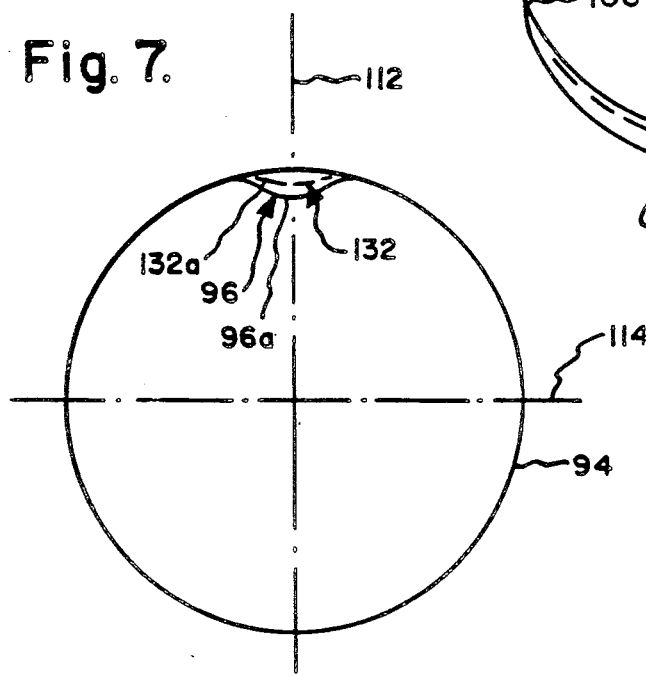

STATOR HAVING SELECTIVELY APPLIED THERMAL CONDUCTIVITY COATING

This application is a continuation of application Ser. No. 07/531,287, filed May 31, 1990 now abandoned.

BACKGROUND OF THE INVENTION

The present invention relates generally to gas turbine engine rotor and stator assemblies, and, more particularly, to a means and method for reducing radial clearance between the stator and rotor due to circumferential distortions.

A conventional gas turbine engine includes a rotor having a plurality of circumferentially spaced rotor blades extending from a rotor disc and a stator assembly having a flowpath surface disposed adjacent to tips of the rotor blades which define a radial running clearance therebetween. The running clearance should be maintained as small as possible to ensure that all fluid flow is channeled through and not around the rotor blades for maximizing energy transfer between the fluid and the rotor blades.

The running clearance in a gas turbine engine changes both during transient operation of the engine and at varying steady state operations of the engine. This is due primarily to differential thermal movement, including expansion and contraction of structures in the engine as the engine is increased or decreased in power. The gas turbine engine includes numerous structures, and airflow and combustion gases of varying temperature. The application of different temperature to structures results in differential thermal movement during transient and, or steady state operation of the engine. Even when a structure is generally symmetric in construction and is exposed to a constant thermal input, machining tolerances can create variations in the thermal mass throughout the structure which in turn causes thermal gradients and differential thermal movement throughout the structure.

Unless differential thermal movement in the gas turbine engine structures is accommodated, thermal distortion and stress therefrom are generated. For example, upon increasing power of a gas turbine engine, rotor blades therein typically are heated and expand faster than a surrounding stator. This can result in the rotor blade tips rubbing against the stator unless the running clearance is initially set relatively large to avoid such rubs. Such large running clearance is undesirable since it decreases the efficiency of the engine.

The stator and rotor will continue to heat and expand until steady-state heat flux conditions are achieved. The stator will typically reach steady-state quicker than the rotor due to its lower thermal mass. Thus the running clearance may vary significantly during transient operation.

Alternatively, the blades may be allowed to intentionally rub the stator by using blades with abrasive tips to cut the stator surface round at a condition of maximum overlap between the stator and the rotor blades. However, a relatively large running clearance will then occur for all conditions of operation of the engine other than the one at which the maximum overlap occurred.

Conventional active clearance control structures are known for predeterminedly channeling a cooling fluid to a stator for minimizing the running clearance between the stator and the rotor blades. However, such systems are relatively complex and do not correct the cause of the varying running clearance.

Furthermore, the running clearance may be non-axisymmetric which requires more complex means for attempting to accommodate such non-axisymmetric running clearances as compared to axisymmetric running clearances. Even in situations where the non-axisymmetric running clearance is predeterminable, the means for accommodating such non-axisymmetric clearances, for example by using active clearance control, is relatively complex and does not necessarily effectively accommodate for such non-axisymmetric clearances, nor does it attempt to correct the cause thereof.

Furthermore, some non-axisymmetric running clearances are due to random occurrences such as a leak of a cooling fluid or a hot combustion gas on an adjacent structure which results in circumferential distortion and a non-axisymmetric running clearance. Once conventional means for accommodating such an occurrence would be to design for a worst case scenario and have a relatively large running clearance which is undesirable.

OBJECTS OF THE INVENTION

Accordingly, one object of the present invention is to provide a new and improved gas turbine engine stator.

Another object of the present invention is to provide a stator effective for accommodating non-axisymmetric running clearance.

Another object of the present invention is to provide a stator effective for accommodating non-axisymmetric running clearance due to random factors.

Another object of the present invention is to provide a stator effective for controlling non-axisymmetric radial running clearance by controlling circumferential thermal distortions of a stator.

Another object of the present invention is to provide a stator effective for reducing non-axisymmetric running clearance.

Another object of the present invention is to provide a stator effective for reducing a cause of non-axisymmetric running clearance.

Another object of the present invention is to provide a stator having relatively simple means for controlling non-axisymmetric running clearance.

SUMMARY OF THE INVENTION

A gas turbine engine stator effective for surrounding a rotor having a plurality of circumferentially spaced blades to define a radial clearance between the stator and blade tips is disclosed. A method and means for controlling non-axisymmetric radial running clearance between the stator and the blade tips includes a coating of preselected thermal conductivity predeterminedly disposed along a circumference of the stator. In an exemplary embodiment of the invention, the coating has either low or high thermal conductivity for reducing thermally induced circumferential distortions of the stator.

BRIEF DESCRIPTION OF THE DRAWING

The novel features believed characteristic of the invention are set forth and differentiated in the claims. The invention, together with additional objects and advantages thereof, is more particularly described in conjunction with the accompanying drawing in which:

FIG. 7 is a schematic representation of a transverse sectional view of the flange illustrated in FIG. 5 showing nominal and distorted positions thereof due to differential temperatures therein.

FIG. 8 is a schematic representation of a transverse sectional view of the high pressure compressor illustrated in FIG. 2 showing nominal and distorted positions thereof due to differential temperatures therein.

FIG. 9 is a schematic, transverse sectional view of the high pressure turbine stator casing illustrated in FIG. 4 showing nominal and distorted positions due to differential temperatures therein.

DETAILED DESCRIPTION

Figure 1:
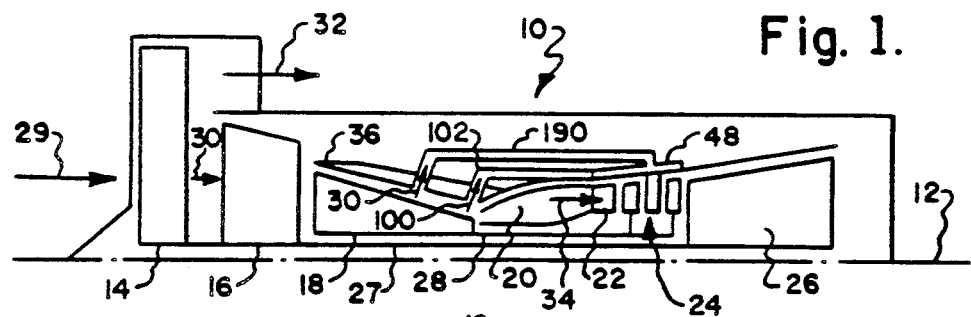
FIG. 1 is a schematic, sectional view of an axisymmetric gas turbine turbofan engine.

Illustrated in FIG. 1 is a schematic representation of an exemplary high bypass turbofan gas turbine engine 10. The engine 10 includes in serial flow communication about a longitudinal centerline axis 12 conventional structures including a fan 14, a low pressure compressor (LPC), or booster compressor 16, a high pressure compressor (HPC) 18, a combustor 20, a high pressure nozzle 22, a high pressure turbine (HPT) 24, and a low pressure turbine (LPT) 26. The low pressure turbine 26 is joined to both the fan 14 and the LPC 16 by a conventional first rotor shaft 27, and the HPT 24 is joined to the HPC 18 by a conventional second rotor shaft 28 for independent rotation relative to the first shaft.

In operation ambient air 29 is channeled into the fan 14 of the engine 10, and a first portion 30 is channeled into the LPC 16 for compression, and a second portion 32 bypasses the LPC 16 for providing thrust from the engine 10. The air first portion 30 is compressed in the LPC 16 and further compressed in the HPC 18, channeled to the combustor 20, mixed with fuel to undergo combustion for generating relatively hot combustion discharge gases 34 which are channeled through the HP nozzle 22 for driving the HPT 24 and the LPT 26.

The engine 10 operates from low to high power settings for powering an aircraft during various modes of operation including idle, take-off, cruise and descent. The engine 10, therefore, operates under transient conditions upon acceleration or deceleration of the first and second rotor shafts 27, 28 as the engine is either powered up or powered down during operation. The engine 10 also operates at steady state conditions, such as, for example at aircraft cruise wherein the power of the engine 10 remains at an intermediate fixed amount and the speeds of the first and second rotor shafts 27, 28 are relatively constant.

Since the HPC 18 compresses the ambient air 29 for generating the compressed air 30, the air 30 undergoes heating, which can typically reach up to about 1,100° F. The combustion discharge gases 34 are at temperatures up to about 2,000° F. Both the compressed air 30 and the combustion gases 34 heat adjacent structures in the HPC 18 and the HPT 24, respectively, thus providing temperature gradients therein which must be accommodated for reducing thermally induced stress and thermally induced distortion.

Figure 2:
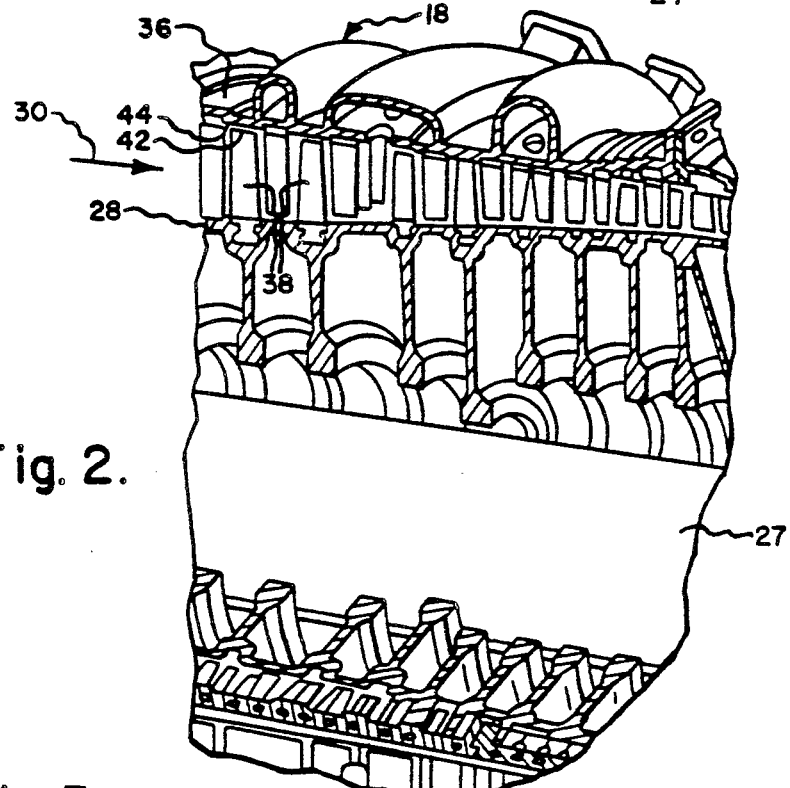
FIG. 2 is a perspective, cut away view of a portion of a high pressure compressor in the engine illustrated in FIG. 1.
Figure 3:
FIG. 3 is a transverse, partly schematic sectional view of the high pressure compressor illustrated in FIG. 2.

More specifically, and for example, the HPC 18 includes a stator in the form of an annular casing 36 as illustrated in FIGS. 1 and 2 which surrounds blade rows each including a plurality of circumferentially spaced blades 38 extending radially outwardly from the rotor 28. Referring also to FIG. 3, which illustrates a cross section of the HPC 18 showing a single blade 38 for clarity, each of the blades 18 includes a blade tip 42 at a radially outer end thereof which is spaced from and faces an annular stator flowpath surface 44. The flowpath surface 44 is the radially inner surface of the HPC casing 36 which is positioned around the blade tips 42 to define a radial running clearance $C_r$.

Accordingly, as the air 30 is compressed in the HPC 18, it is heated and therefore heats the blades 38. The blades 38 expand upon heating and the running clearance $C_r$ is thereby affected. Typically, the casing 36 does not heat as fast as the blades 38 and therefore does not expand as quickly as the blades 38. The running clearance $C_r$, therefore, must be sufficiently large to avoid rubbing of the blade tips 42 against the flowpath surface 44 which is conventionally known.

A similar, conventionally known running clearance $C_r$ is also found in the HPT 24. More specifically, and referring to FIGS. 1 and 4, the HPT 24 includes a stator in a conventional form of an HPT annular casing 48. The casing 48 includes first and second axially spaced annular flanges 50 and 52, respectively, formed integrally therein. Each flange 50 and 52 includes a radially outer portion 50a and 52a extending radially outwardly from a radially outer surface 54 of casing 48. The flanges 50 and 52 also include radially inner portions 50b and 52b, respectively, which extend radially inwardly from a radially inner surface 56 of the casing 48. A conventional intermediate turbine nozzle 58 is spaced radially inwardly from the casing 48 and includes a plurality of circumferentially spaced hollow nozzle vanes 60 suitably joined to a radially outer nozzle casing 62. The nozzle casing 62 includes integral, axially spaced first and second annular flanges 64 and 66, respectively, which are conventionally joined to the casing first and second flanges 50 and 52, respectively.

The HPT 24, in this exemplary embodiment, includes a first rotor stage 68 and a second rotor stage 70 both joined to the second rotor 28 which provides power to the HPC 18 from HPT 24. The first stage 68 includes a plurality of circumferentially spaced blades 72 disposed between the HPT nozzle 22 and the intermediate nozzle 58. Each of the blades 72 has a blade tip 74 which is spaced from and faces a conventional shroud 76. More specifically, the shroud 76 includes an inner flowpath surface 78 which is positioned around the blade tips 74 to define the radial running clearance $C_r$. The shroud 76 has a downstream end 80 which is conventionally secured to and supported by the first flange 50 at the flange inner portion 50b, and an upstream end 82 conventionally secured to and supported by the casing 48.

The HPT running clearance $C_r$ must also accommodate differential thermal movement between the blades 72 and the shroud 76 during operation in a manner similar to that described above for the HPC running clearance $C_r$. The combustion gases 34 are relatively hot and heat the blades 72, thereby causing expansion thereof. The casing 48 and the shroud 76 are cooler than the blades 72 and therefore do not expand as quickly.

Furthermore, the running clearance $C_r$ of both the HPC 18 and the HPT 24 may not only be axisymmetric relative to the engine longitudinal centerline 12, but may be non-axisymmetric, which is considerably more complex to accommodate. A significant contributor to non-axisymmetric radial running clearance $C_r$ variations is circumferential thermal distortion of the flowpath structure. This distortion includes at least two types.

Figure 5:
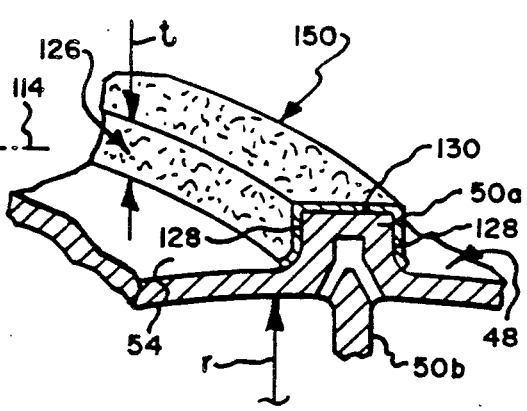
FIG. 5 is a partly sectional, perspective view of a portion of a flange used in a stator adjacent to the high pressure turbine illustrated in FIG. 4.
Figure 4:
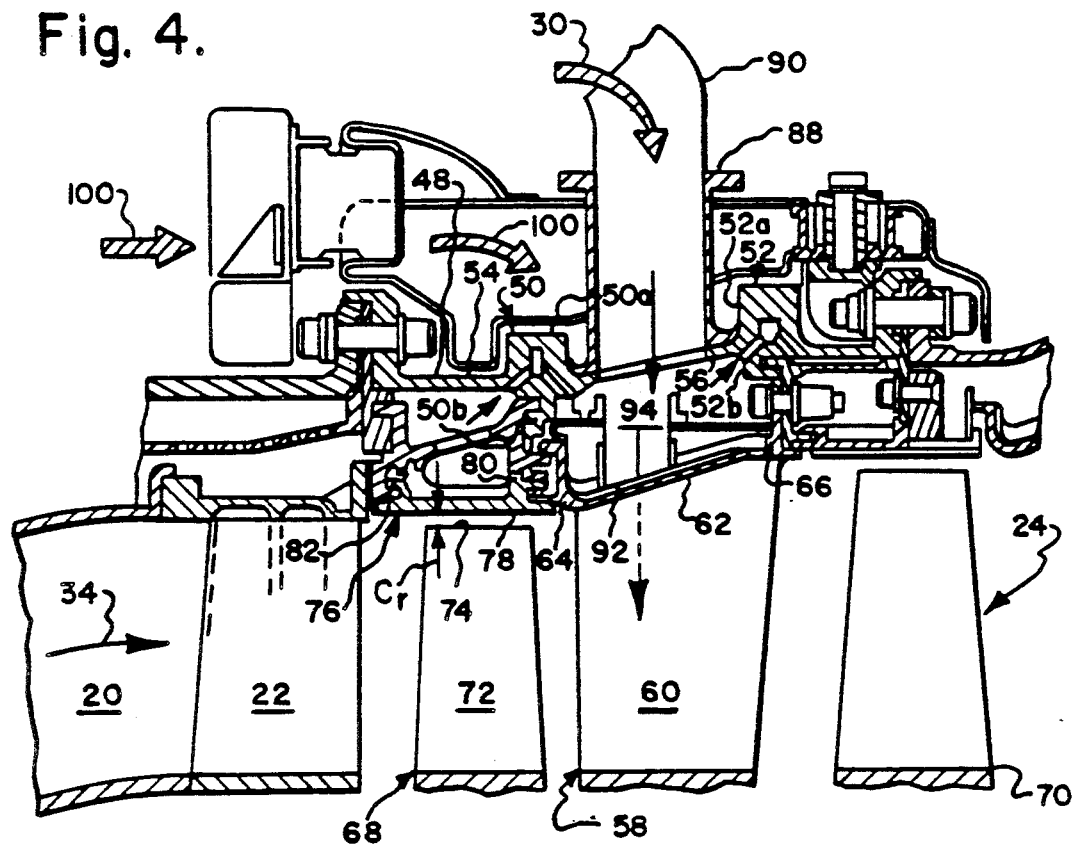
FIG. 4 is a sectional view of a high pressure turbine and adjacent structures in the engine illustrated in FIG. 1.

The first type of thermal distortion can be shown by examining FIGS. 4 and 5. FIG. 5 illustrates more particular, the portion of the HPT first flange 50 showing a nominal radius thereof r and a thickness t of the first flange outer portion 50a which extends above the casing outer surface 54. Since the flange 50 supports in part the shroud 76, thermal distortion therein affects the radial position of the shroud 76 and therefore the amount of the HPT running clearance $C_r$. Due to manufacturing tolerances, the thickness t and radius r may vary around the circumference of the flange 50. Such variation is a random variation which causes a variation in thermal mass around the circumference of the flange 50. This can result in both a transient and steady state circumferential thermal gradient in the flange 50 which can distort the casing 48 out of round and thus create non-axisymmetric running clearances $C_r$. Since this is a random occurrence, it is therefore not predictable and difficult to accommodate.

The second type of distortion is predictable and is due to design features located at discrete circumferential locations relative to the longitudinal centerline axis 12 of the engine which have thermal response characteristics different from the rest of the structures. One example is the horizontal split line flange common to compressor casings.

More specifically, and referring to FIGS. 2 and 3, the HPC casing 36 includes an arcuate upper portion 36a extending 180 degrees, and arcuate lower portion 36b extending 180 degrees. A pair of coplanar, horizontally extending first and second flanges 84 and 86 respectively, are joined integrally to each of the casing upper and lower portions 36a and 36b, respectively, for joining together the upper and lower portions 36a and 36b by conventional means such as bolts. The added thermal mass of the flanges 84 and 86 causes them to thermally lag the thermal response of the casing 36 and thereby creates a thermal distortion in the casing 36 in both transient and steady state operation.

Another example of a discrete design feature having different thermal response characteristics includes local air ports around a casing used to supply secondary airflow. More specifically, and referring to FIGS. 1 and 4, the HPT 24 further includes a plurality of circumferentially spaced air inlet tubes 88 joined in flow communication to the HPT casing 48. The tubes 88 are conventionally joined in flow communication to bleed air tubes 90 joined to the HPC casing 36 for bleeding a portion of the compressed air 30. Referring to both FIGS. 4 and 6, the turbine nozzle 58 further includes a plurality of circumferentially spaced inlet holes 92 disposed in the nozzle casing 62. The HPT casing 48 is spaced from the nozzle casing 62 and defines a plenum 93 which receives the compressed air 30 from the inlet tubes 88 for channeling the air 30 into the nozzle inlet holes 92 and into the hollow nozzle vanes 60 for cooling thereof as is conventionally known.

During operation of the engine 10, compressed air 30 is channeled through the inlet tubes 88 into the plenum 93 and generates a temperature gradient in the casing 48. This temperature gradient generates circumferential distortion in the casing 48 during both transient and steady state operation, and inasmuch as the casing 48 supports the shroud 76 through the first flange 50 and the shroud downstream end 80, the HPT running clearance $C_r$ is affected.

The above types of non-axisymmetric running clearance variation may be additionally appreciated from an examination of the schematic representations illustrated in FIGS. 7, 8 and 9. More specifically, FIG. 7 illustrates the schematic representation of a nominal, or average radial position 94 of a flange, such as the flange 50 illustrated in FIGS. 4 and 5. The nominal position 94 can either be at a steady state condition, or at a particular transient condition. At the top of FIG. 7, a thermal lag, or distortion 96 is illustrated which represents for example, a local section of the flange 50 having either a relatively larger thickness t or a relatively larger radius r which would result in increased thermal mass and therefore a decrease in thermal response upon heating of the flange 50. As a result, such portion of the flange 50 experiences a circumferential distortion which in this exemplary case is a local distortion in the radial direction due to relative expansion less than the adjacent portions of the flange 50. The circumferential distortion 96 illustrated in FIG. 7 can also occur, for example, upon a leak of relatively cool airflow upon the flange 50.

FIG. 4 illustrates a conventional clearance control manifold 98 surrounding the casing 48 which receives compressor discharge air 100 from the HPC 18 through a conventional fluid conduit 102, as shown in FIG. 1. If a portion of the air 100 should leak from the manifold 98 at a discrete point against the flange 50, the circumferential distortion such as is shown in FIG. 7 can result.

FIG. 8 illustrates schematically the HPC casing 36 and horizontal flanges 84 and 86. The nominal, or average position of the casing 36 and the flanges 84 and 86 during either a steady state condition or at a particular transient condition is represented by the nominal position 104 representing an average radius of the casing 36. As the air 30 is compressed in the HPC 18, the casing 36 will, for example, expand faster than the horizontal flanges 84 and 86 since the casing 36 is relatively thin and has a relatively low thermal mass as compared to the relatively thick and high thermal mass flanges 84 and 86. Accordingly, the resultant relative radial position of the casing 36 and flanges 84 and 86 is represented by distorted position 106.

The distorted position 106 intersects the nominal position 104 at four nodes 108 wherein the radius of the distorted position 106 is equal to the radius of the corresponding nominal position 104. The distorted position includes two antinodes 110 of maximum radial displacement relative to the nominal position 104 disposed at 12 o'clock and 6 o'clock positions, or symmetrically about a vertical centerline axis 112 of the engine 10. Two antinodes 113 of minimum radial displacement relative to the nominal position 104 are symmetrically disposed at 3 o'clock and 9 o'clock positions symmetrically about a horizontal centerline axis 114 of the engine 10, which is disposed perpendicular to the vertical centerline axis 112. FIG. 8, in conjunction with FIG. 3, clearly indicates that as the air 30 is compressed in the HPC 18, the casing upper portion 36a and lower portion 36b expand more than the nominal position 104 while the casing 36 adjacent to and with the horizontal flanges 84 and 86 thermally lags such expansion and results in a negative radial distortion relative to the nominal position 104.

FIG. 9 illustrates a nominal position 116 of the HPT casing 48 illustrated in FIG. 4 at a circumference through transverse centerlines of the inlet tubes 88 at either a steady state condition or at a particular transient condition. As the combustion discharge gases 34 heat the turbine nozzle 58, heat is conducted and radiated to the casing 48. The compressed air 30 is channel through each of the inlet tubes 88 and heats, or cools as the case may be, the casing 48 adjacent to the tubes 88 differently than the casing 48 between adjacent tubes 88. In an example where the compressor air 30 is effective for cooling the casing 48 as it enters each of the tubes 88, the distorted position 118 results as shown in FIG. 9.

The distorted position 118 includes sixteen circumferentially spaced nodes 120 representing no difference in relative radial position between the distorted position 118 and the nominal position 116. The eight circumferentially spaced inlet tube 88 are represented in FIG. 9 by respective centerline positions at which positions the casing 48 has an antinode 122 of minimum relative radial displacement from the nominal position 116. Equidistantly spaced between adjacent inlet tubes 88 is an antinode 124 of maximum relative radial displacement from the nominal position 116.

FIG. 9 clearly indicates that the casing 48 has thermally induced circumferential distortions having maximum radial position at the maximum antinodes 124, since the casing 48 between adjacent inlet tubes 88 is relatively hot and therefore expands radially more than the casing 48 adjacent to and at the inlet tubes 88. Since the inlet tubes 88 provide relatively cool air 30, the casing 48 adjacent to the inlet tubes 88 thermally lags in radial expansion and therefore has a relatively smaller radial position than the adjacent casing 48 between adjacent inlet tubes 88. Since the casing 48 experiences the distorted position 118, the shroud 76, as illustrated in FIG. 4, which is supported by the first flange 50 of the casing 48, will also experience a corresponding circumferential distorted position resulting in a non-axisymmetric running clearance $C_r$.

In accordance with a preferred embodiment of the present invention, means for controlling the non-axisymmetric radial clearance $C_r$ between the stator flowpath surfaces and blade tips described above is provided. The controlling means includes a coating of preselected thermal conductivity predeterminedly disposed along the circumference of the stators.

More specifically, and for example, the invention may be practiced in accordance with the flange 50 illustrated in FIGS. 4 and 5. One embodiment of the invention may include the flange 50 having random variations in the thickness t and the radius r, or, the flange 50 being subjected to a local temperature difference, such as for example caused by leaking of a cooling fluid such as the compressor discharge air 100 against the flange 50. To reduce the circumferential distortion 96 caused thereby as illustrated in FIG. 7, the first flange 50 is preferably provided with a coating 126 having a high thermal conductivity. As used in the present description, high thermal conductivity means increased ability for conducting heat as compared to the thermal conductivity of the underlying surface, and low thermal conductivity means a reduced ability for conducting heat as compared to the underlying surface. Low thermal conductivity is synonymous with a good heat insulator, whereas a high thermal conductivity is synonymous with a good heat conductor.

Since the flange 50 is described above as subject to random variations which result in thermal distortion, a high thermal conductivity coating 126 is preferred and should cover the flange 50 as much as possible. For example, the flange 50 includes two axially spaced side surfaces 128 joined to a top surface 130 as illustrated in FIG. 5. The coating 126 is applied with a generally constant thickness over the entirety of the side surfaces 128 and the top surface 130. The high conductivity coating 126, which for example may be relatively pure nickel plated on the surfaces 128, 130, is effective for transferring heat from the hotter regions of the flange 50 to cooler regions for obtaining a more uniform temperature of the flange 50. The flange 50 may comprise conventional Inconel 718 (IN718), and nickel has a thermal conductivity approximately five times greater than the thermal conductivity of IN718. By providing the coating 126 on the flange 50, differential temperatures on the flange 50 are reduced resulting in a reduced distorted position 132 as illustrated in FIG. 7. The reduced distorted position 132 includes an antinode 132a having minimum circumferential distortion, or radial displacement from the nominal position 94 which is substantially less than that associated with the minimum antinode 96a of the uncorrected distortion 96.

In accordance with another embodiment of the present invention, and as illustrated in FIG. 3 and 8, a coating 134 having a low thermal conductivity is disposed on the inner flowpath surface 44 of both the HPC casing upper portion 36a and lower portion 36b and generally aligned coextensively with the maximum antinodes 110. More specifically, the coatings 134 are disposed along first and second arcs 134a and 134b on the casing upper and lower portions 36a and 36b respectively, symmetrically relative to the vertical centerline axis 112. The extent of the arcs 134a and 134b, in degrees 81, and 82, is determined for each particular design application, but the arcs 134a and 134b generally extend along the inner flowpath surface 44 under the maximum antinodes 110 up to the adjacent nodes 108 to compensate for the maximum antinodes 110. By introducing the low thermal conductivity coating 134 predeterminedly positioned relative to the maximum antinodes 110 in the casing 36, heat transfer into the casing 36 at such locations is reduced for better matching the thermal response of the casing 36 away from the flanges 84 and 86 to the thermal response of the casing 36 adjacent to and at the flanges 84, 86. A more uniform temperature response of the casing 36 therefore reduces the maximum and minimum antinodes 110 and 113 as shown as the reduced circumferential thermal distortion position 136 illustrated in FIG. 8. The low thermal conductivity coating 134 may comprise any conventional thermal barrier coating such as, for example, a ceramic based mixture which is suitably secured to the flowpath surface 44 by conventional means such as rapid solidification plasma deposition. The coating 136 preferably extends for the full axial extent of the HPC casing 36.

Accordingly, by introducing the low thermal conductivity coating 134 in the predetermined circumferential position along the flowpath surface 44 away from the horizontal flanges 84 and 86, circumferential distortion due to differential thermal expansion and contraction of the casing 48 is reduced. Since the flowpath surface 44 faces the HPC blade tips 42, the non-axisymmetric radial running clearance Cr therebetween is also reduced from the maximum associated with the distorted position 110 without the coating 134, to reduced values associated with the reduced distortion 136 obtainable by using the coating 134.

Figure 6:
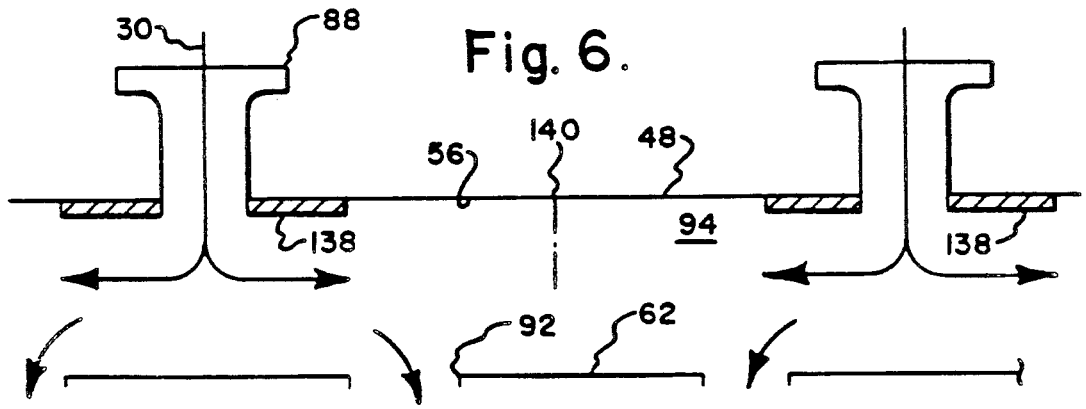
FIG. 6 is a schematic representation of a portion of the circumference of the stator casing and adjacent structure illustrated in FIG. 4.

In accordance with another embodiment of the present invention, and as illustrated in FIGS. 4, 6, and 9, a low thermal conductivity coating 138 is disposed on the HPT casing inner surface 56 around each of the inlet tubes 88 for reducing the differential, radial thermal movements, including expansion and contraction, of the casing 48. More specifically, the coating 138, which preferably comprises a thermal barrier coating such as the above mentioned ceramic based mixture suitably secured to the inner surface 56, preferably extends from the first flange 50 to the second flange 52 and around each inlet tube 88 for a portion of the distance between adjacent tubes 88. FIG. 6 illustrates that the compressed air 30 radially enters each inlet tube 88 at a maximum velocity and is turned circumferentially generally parallel to the casing surface 56. The air 30 is extracted for the purpose of cooling at inlet holes 92 as it flows circumferentially. Thus the velocity of the stream of air 30 will decrease as it travels circumferentially. Adjacent streams of the air 30 will reach zero velocity at about a midplane 140 disposed equidistantly between adjacent inlet tubes 88. The air 30 is effective for cooling the casing inner surface 56, which cooling is proportional to the velocity of the air 30.

Accordingly, the air 30 most efficiently cools the inner surface 56 adjacent to the inlet tubes 88, and cools the inner surface 56 away from the inlet tubes 88 with a continuing decrease in effectiveness since the velocity of the air 30 is continually decreasing.

Figure 10:
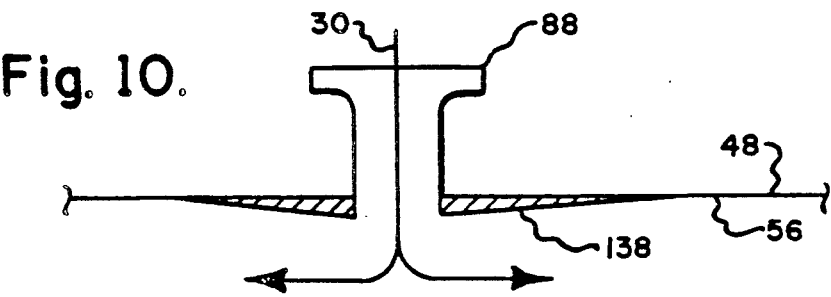
FIG. 10 is a schematic, sectional view of the high pressure turbine stator casing illustrated in FIG. 4 showing a single inlet air tube and a thermal conductivity coating adjacent thereto.

Accordingly, in a preferred embodiment of the invention, the low thermal conductivity coating 138 need only be applied adjacent to each inlet tube 88 for effectiveness. The circumferential extent of the coating 138 between adjacent inlet tube 88 is determined for particular design applications. Although in a preferred embodiment of the invention, the coating 138 has a constant thickness, in another embodiment of the invention as illustrated in FIG. 10, the coating 138 can have a varying thickness of a maximum value at the intersection of the inner surface 56 and the inlet tube 88, continuously decreasing therefrom toward an adjacent inlet tube 88. Such a varying thickness coating 138 can more effectively match the heat transfer ability of the air 30 by providing a large thickness of the coating 138 where the velocity is greatest with decreasing thicknesses of the coating 138 where the velocity is decreased, to more effectively and uniformly insulate the inner surface 56.

Accordingly, by so predeterminedly thermally insulating the inner surface 56 of the casing 48, a reduced circumferential distortion 142 as illustrated in FIG. 9 may be obtained. The coating 138 is effective for reducing the amount of cooling of the casing 48 adjacent to each of the inlet tubes 88, thus resulting in a relatively higher temperature of the casing 148 adjacent to the inlet tubes 88 and reduced minimum and maximum antinodes 142a and 142b respectively, as compared to the minimum and maximum antinodes 122 and 124, respectively, of the distorted position 118 which would result without the use of the coating 138.

In all of the above embodiments of the present invention, the preselected thermal conductivity coating (e.g. 126, 134 and 138) is predeterminedly applied along a circumference of a respective stator for reducing circumferential thermal distortion in the respective stator due to differential thermal movements, including expansion and contraction, which correspondingly reduces the differential radial position along the stator circumference thus reducing the respective non-axisymmetric running clearance $C_r$. In random occurrences such as those associated with the flange 50, the high thermal conductivity coating ensures a more uniform temperature of the flange 50, thus reducing non-axisymmetric running clearance. And in the HPC 18 having the horizontal flanges 84, 86 and in the HPT 24 having the inlet tubes 88, a preferred application of the low thermal conductivity coating (134 and 138) is effective for reducing the non-axisymmetric running clearance.

Accordingly, in accordance with another embodiment of the invention, a method is provided for controlling the non-axisymmetric radial clearance between a stator and a rotor which comprises the step of applying the coating having the preselected thermal conductivity along a circumference of the stator positioned for controlling circumferential thermal distortion of the stator which causes changes in the radial running clearance between the stator and rotor. In the flange 50 embodiment of the invention, the method includes applying the coating 126 having a high thermal conductivity to the flange 50 for reducing temperature gradients in the flange 50 and thereby reducing differential radial thermal movement in the flange 50.

In the HPC 18 embodiment of the invention including the horizontal flanges 84, 86, the method includes applying the coating 134 having a low thermal conductivity along a circumference away from the flanges 84 and 86 for reducing differential radial thermal movement between the casing 36 and the horizontal flanges 84, 86.

In the HPT 24 embodiment of the invention including the inlet tubes 88, the method includes applying the coating 138 having a low thermal conductivity on the casing inner surface 56 adjacent to each of the tubes 88 for reducing the differential radial thermal movement of the casing 48.

In all three method examples, the reduction in circumferential thermal distortion correspondingly results in a reduction in the non-axisymmetric running clearance $C_r$, as well as a reduction in thermally induced stress in the respective stator.

The embodiments of the invention disclosed above may be used to accommodate circumferential thermal distortion in the stators both under transient and steady-state operation. However, the optimum value of the thermal conductivity coating and its optimum position will be determined for each particular design, and should also be determined by evaluating operation at both transient and steady-state operation to ensure that the resulting reduced radial running clearance occurs at desired transient and/or steady-state operations.

While there have been described herein what are considered to be preferred embodiments of the present invention, other modifications of the invention shall be apparent to those skilled in the art from the teachings herein, and it is, therefore, desired to be secured in the appended claims, all such modifications as fall within the true spirit and scope of the invention.

More specifically, and for example only, a high thermal conductivity coating may also be utilized with a flange or ring subject to radial thermal gradients from an inner diameter to an outer diameter. Such temperature gradients will cause stress in the flange or ring due to differential thermal expansion and contraction as well as cause thermal distortion. By utilizing a high thermal conductivity coating over the flange or the ring, the thermal gradients can be reduced by conducting heat to the colder sections of the flange or ring and thereby reduce thermal distortion and stress.

Furthermore, although the preferred embodiments of the invention include means for controlling non-axisymmetric radial clearance by reduced circumferential thermal distortions, in other applications, it may be desirable to increase circumferential thermal distortions at preselected positions. For example, it may be desirable to increase circumferential thermal distortion in a situation where an increased interference fit between two concentric piloting surfaces is desired at elevated temperature but a lesser interference fit is desired at ambient conditions for ease of assembly.

Accordingly, what is desired to be secured by Letters Patent of the United States is the invention as defined and differentiated in the following claims.

We claim:

1. A gas turbine engine stator for surrounding a rotor including a plurality of circumferentially spaced blades, each having a tip, comprising:
   a stator flowpath surface adjacent and around said rotor blade tips to define a radial clearance therebetween; and
   means for controlling non-axisymmetric radial clearance which occurs between said stator flowpath surface and said blade tips, said controlling means including a coating, selected on the basis of the thermal conductivity of said coating, wherein said coating is disposed along a portion of a circumference of said stator for reducing circumferential distortion in said stator due to differential thermal movements in said stator.

2. A stator according to claim 1 further including an annular casing having an inner surface defining said stator flowpath surface, and a horizontal flange joined to said casing; and wherein said coating is disposed circumferentially along a first arc on an upper inner surface of said casing positionable toward said blade tips and circumferentially along a second arc on a lower inner surface of said casing positionable toward said blade tips; and said coating has a low thermal conductivity for reducing said non-axisymmetric radial clearance.

3. A stator according to claim 1 further including:
   an annular casing having an upper portion, a lower portion, and an inner surface defining said stator flowpath surface;
   a pair of coplanar, horizontally extending flanges joined to each of said casing upper and lower portions for joining together said upper and lower portions;
   said casing having antinodes of maximum thermal radial growth in said casing upper and lower portions and antinodes of minimal thermal radial growth at said flanges due to an increase in temperature of said casing; and
   said coating having a low thermal conductivity and being disposed on said casing upper portion inner surface and said casing lower portion inner surface to reduce said maximum and minimum antinodes.

4. A stator according to claim 3 further including a vertical centerline axis and wherein said flanges are disposed perpendicularly to said vertical centerline axis, and said coating is disposed on said casing upper portion inner surface over a first arc, and on said casing lower portion inner surface over a second arc, wherein said first and second arcs are each divided into 2 equal subarcs by said vertical centerline axis.

5. A stator according to claim 4 wherein each of said first and second arcs extend circumferentially by an amount corresponding to said antinodes of maximum thermal radial growth in said casing upper and lower portions and wherein said coating is disposed axially over the entirety of said casing upper portion inner surface and said casing lower portion inner surface.

6. A stator according to claim 5 wherein said coating is a ceramic based mixture.

7. A stator according to claim 1 further including:
   a stator casing having first and second axially spaced annular flanges and a radially inner surface, each flange having a radially inner portion;
   a plurality of circumferentially spaced air inlet tubes joined in flow communication with said stator casing;
   a turbine nozzle including a nozzle casing spaced from said stator casing and having first and second annular flanges joined to said stator casing first and second flange inner portions, respectively, and a plurality of circumferentially spaced hollow nozzle vanes extending from said nozzle casing, each nozzle vane being in flow communication with a respective inlet hole in said nozzle casing for receiving air from said inlet tube; and
   a coating disposed on said stator casing inner surface applied around each of said inlet tubes, said coating extending partially between adjacent said inlet tubes in a circumferential direction and extending therebetween said radially inner surfaces of said stator casing first and second axially spaced annular flanges in an axial direction, and said coating having a low thermal conductivity for reducing differential radial thermal movement of said casing.

8. A stator according to claim 7 further including an annular shroud for surrounding said rotor, said shroud being disposed upstream from said nozzle and supported by said stator casing first flange inner portion.

9. A stator according to claim 8 wherein air is flowable through said inlet tubes and generates in said stator casing antinodes of minimum thermal radial growth at each of said inlet tubes and antinodes of maximum thermal radial growth between each of said inlet tubes, said coating being effective for reducing said minimum and maximum antinodes.

10. A stator according to claim 9 wherein said coating comprises a thermal barrier coating of generally constant thickness extending around each of said inlet tubes and also extending partially between adjacent inlet tubes.

11. A stator according to claim 9 wherein said coating comprises a thermal barrier coating of varying thickness decreasing from each of said inlet tubes toward adjacent ones of said inlet tubes.

12. A stator according to claim 9 wherein said thermal barrier coating is a ceramic based mixture.

13. A method for controlling non-axisymmetric radial clearance between a gas turbine engine stator and rotor comprising the steps of providing a stator casing forming a flowpath surface around the rotor to define a radial clearance therebetween and selectively applying a coating, selected on the basis of the thermal conductivity of said coating, along a portion of a circumference of said stator positioned for controlling circumferential thermal distortion of said stator causing changes in radial clearance between said stator and said rotor, wherein:

said stator includes a horizontal flange fixedly joined to said stator casing; and said coating applying step includes applying a coating having low thermal conductivity on said casing along said portion of a circumference located on said casing flowpath surface wherein said portion of a circumference is separate from said flange, for reducing differential radial thermal movement between said casing and said flange.

14. A method for controlling non-axisymmetric radial clearance between a gas turbine engine stator and rotor comprising the steps of providing a stator casing forming a flowpath surface around the rotor to define a radial clearance therebetween and selectively applying a coating, selected on the basis of the thermal conductivity of said coating, along a portion of a circumference of said stator positioned for controlling circumferential thermal distortion of said stator causing changes in radial clearance between said stator and said rotor, wherein:

said stator casing has a radially inner surface, first and and second axially spaced annular flanges, each of said flanges having a radially inner portion, and a plurality of air inlet tubes joined in flow communication to said casing; and said coating applying step includes applying a coating having low thermal conductivity disposed on said casing inner surface around each of said inlet tubes, said coating extending partially between adjacent said inlet tubes in a circumferential direction and extending therebetween said radially inner surfaces of said stator casing first and second axially spaced flanges in an axial direction, for reducing differential radial thermal movement of said casing relative to said inlet tubes.

15. Gas turbine engine stator, comprising:

a vertical centerline axis;

a horizontal centerline axis;

a first coating comprising nickel and having a high thermal conductivity;

a second coating comprising a ceramic material and having a low thermal conductivity;

annular flanges, each of said annular flanges having an upper portion which includes a spaced pair of side surfaces joined by a top surface wherein said flange side and top surfaces are covered with said nickel coating, said nickel coating controlling radial growth differentials by creating heat flux away from hot areas towards cold areas;

an annular casing including an inner flowpath surface, wherein said inner flowpath surface is subdivided into four arcs of 90° defined by said vertical centerline axis and said horizontal centerline axis, wherein said ceramic coating is applied to each of said inner flowpath surface arcs starting at said vertical centerline axis and extending towards said horizontal centerline axis by an arc length which is varied in order to achieve minimal thermal distortion; and an outer casing including a plurality of circumferentially spaced air inlet tubes to provide cooling air, a radially inner surface, and first and second axially spaced annular flanges, each flange having a radially inner portion wherein said ceramic coating is disposed on said outer casing inner surface applied around each of said inlet tubes, said ceramic coating extending partially between adjacent said inlet tubes in a circumferential direction by an amount varied in order to achieve minimal thermal distortion, and extending therebetween said radially inner surfaces of said outer casing first and second axially spaced annular flanges in an axial direction, said ceramic coating comprising a constant thickness.

* * * * *